United States Patent
Lyle et al.

(10) Patent No.: US 8,126,974 B2
(45) Date of Patent: Feb. 28, 2012

(54) SPECIFYING DURING MEETING ESTABLISHMENT WHEN RESPONDENTS ARE TO BE PROMPTED FOR ATTENDANCE INTENTIONS

(75) Inventors: Ruthie D. Lyle, Durham, NC (US); Ulysses Lamont Cannon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 12/114,547

(22) Filed: May 2, 2008

(65) Prior Publication Data

US 2009/0276498 A1 Nov. 5, 2009

(51) Int. Cl.
*G06F 15/16* (2006.01)
(52) U.S. Cl. .......................... 709/206; 709/207; 709/236
(58) Field of Classification Search .................. 709/204, 709/206–207, 236
See application file for complete search history.

(56) References Cited

U.S. PATENT DOCUMENTS

| | | | |
|---|---|---|---|
| 2002/0194049 A1* | 12/2002 | Boyd | 705/9 |
| 2007/0094065 A1* | 4/2007 | Wu et al. | 705/9 |
| 2007/0226034 A1* | 9/2007 | Khan | 705/9 |
| 2007/0250370 A1* | 10/2007 | Partridge et al. | 705/8 |
| 2009/0070678 A1* | 3/2009 | Landar et al. | 715/733 |
| 2009/0094088 A1* | 4/2009 | Chen et al. | 705/9 |
| 2009/0204464 A1* | 8/2009 | Mujkic et al. | 705/9 |

* cited by examiner

*Primary Examiner* — Patrice Winder
*Assistant Examiner* — Ebrahim Golabbakhsh
(74) *Attorney, Agent, or Firm* — Patents on Demand, P.A.; Brian K. Buchheit; Scott M. Garret

(57) ABSTRACT

A meeting initialization request for a meeting can be identified. The meeting initialization request can specify a prompt time for attendance intentions. A programmatic trigger, referred to as a prompt trigger, can be established for the prompt time. A firing of this prompt trigger can occur when a current time equals the prompt time. At this time, at least one potential attendee for the meeting can be determined. A set of potential attendees is typically defined by the meeting initiator within the meeting initialization request. An intention message can be sent to the determined potential attendee responsive to a firing of the programmatic trigger. This intention message can be sent at a time close to the prompt time. The intention message can prompt the potential attendee to indicate whether the potential attendee intends to attend the meeting.

18 Claims, 1 Drawing Sheet

SPECIFYING DURING MEETING ESTABLISHMENT WHEN RESPONDENTS ARE TO BE PROMPTED FOR ATTENDANCE INTENTIONS

BACKGROUND OF THE INVENTION

The present invention relates to the field of calendaring software, and, more particularly, to providing an ability for a meeting initiator to specify during meeting establishment when respondents are to be prompted for attendance intentions and providing a way to automatically summarize and coordinate delivery of the intention responses.

In a calendaring application, a meeting initiator generally specifies meeting recipients when a meeting is established. Each of these recipients receives an electronic message constituting an invitation, which the recipients are able to add to their personal calendar. The meeting initiator can specify an optional field that provides feedback regarding whether recipients intend to attend the meeting or not.

One problem with current systems is that the intentions are prompted for at the time the meeting invitation message is received, which is at approximately the time the meeting was established within the calendaring application. Responses regarding attendance intentions provided upon invitation receipt can be relatively inaccurate.

That is, meetings are often established as soon as details are finalized, which can be significantly advanced from a time of the meeting event. Scheduling conflicts and other changes occurring between a time invitations to a meeting are sent and the actual meeting time will cause many who originally intended to attend to no longer be able to attend. Thus, intention responses received through conventional calendaring systems are relatively inaccurate.

Another problem with current systems is that intention responses are conveyed to the meeting initiator or a designated coordinator in a series of messages (often email messages) received at approximately a time that invitees respond with their intentions. Different invitees can send their responses days or weeks apart from each other. This results in a substantial manual effort for the meeting coordinator to group, track, and tally the responses. It is extremely easy for a message coordinator to miscalculate a set of intention responses for a meeting, especially when that coordinator is responsible for multiple meetings, which results in a sometimes overwhelming barrage of intention responses received over a chaotically distributed time period.

BRIEF SUMMARY OF THE INVENTION

One aspect of the present invention can include a system for managing meetings that permits and establishment of a prompt time and/or a tally time. The system can include a meeting management software program, a meeting data store, and a user interface. The meeting management software program can receive, manage, and store meeting specific information and to perform a set of programmatic actions related to the meeting specific information. The meeting data store can store digitally encoded information including the meeting specific information used by the meeting management software program. The user interface of the meeting management software program can include a meeting establishment view. The meeting establishment view can include a set of interface controls for establishing specifics for a meeting. The meeting establishment view can include a prompt time element that accepts input defining a configurable prompt time. The prompt time can represents a time when potential attendees are to be presented messages to indicate whether each potential attendee intends to attend the meeting. A programmatic trigger for the prompt time, referred to as the prompt trigger, can be established. The meeting management software can fire the prompt trigger and can perform a programmatic action related to the prompt time when a current time equals the prompt time.

Another aspect of the present invention can include a method, apparatus, computer program product, and system for delaying meeting intention responses. In this aspect, a meeting initialization request for a meeting can be identified. The meeting initialization request can specify a prompt time for attendance intentions. A programmatic trigger, referred to as a prompt trigger, can be established for the prompt time. A firing of this prompt trigger can occur when a current time equals the prompt time. At this time, at least one potential attendee for the meeting can be determined. A set of potential attendees is typically defined by the meeting initiator within the meeting initialization request. An intention message can be sent to the determined potential attendee responsive to a firing of the programmatic trigger. This intention message can be sent at a time close to the prompt time. The intention message can prompt the potential attendee to indicate whether the potential attendee intends to attend the meeting.

Still another aspect of the present invention can include a method, apparatus, computer program product, and system for summarizing intention responses. In this aspect, a meeting initialization request for a meeting can be identified. The meeting initialization request can specify a tally time for the meeting. The tally time can be a time at which a set of invitee provided intention responses are to be summarized, and/or received intention responses are to be conveyed to a meeting coordinator. A programmatic trigger, referred to as a tally trigger, can be established for the tally time. The tally trigger can fire when a current time equals the tally time. Metrics from a plurality of responses from potential attendees can then be compiled from the responses or otherwise generated. These compiled metrics can be used to create an expected attendance report. The expected attendance report can be sent or otherwise made available to a previously designated entity (e.g., the meeting initiator or other designated meeting coordinator).

DETAILED DESCRIPTION OF THE INVENTION

Figure 1:
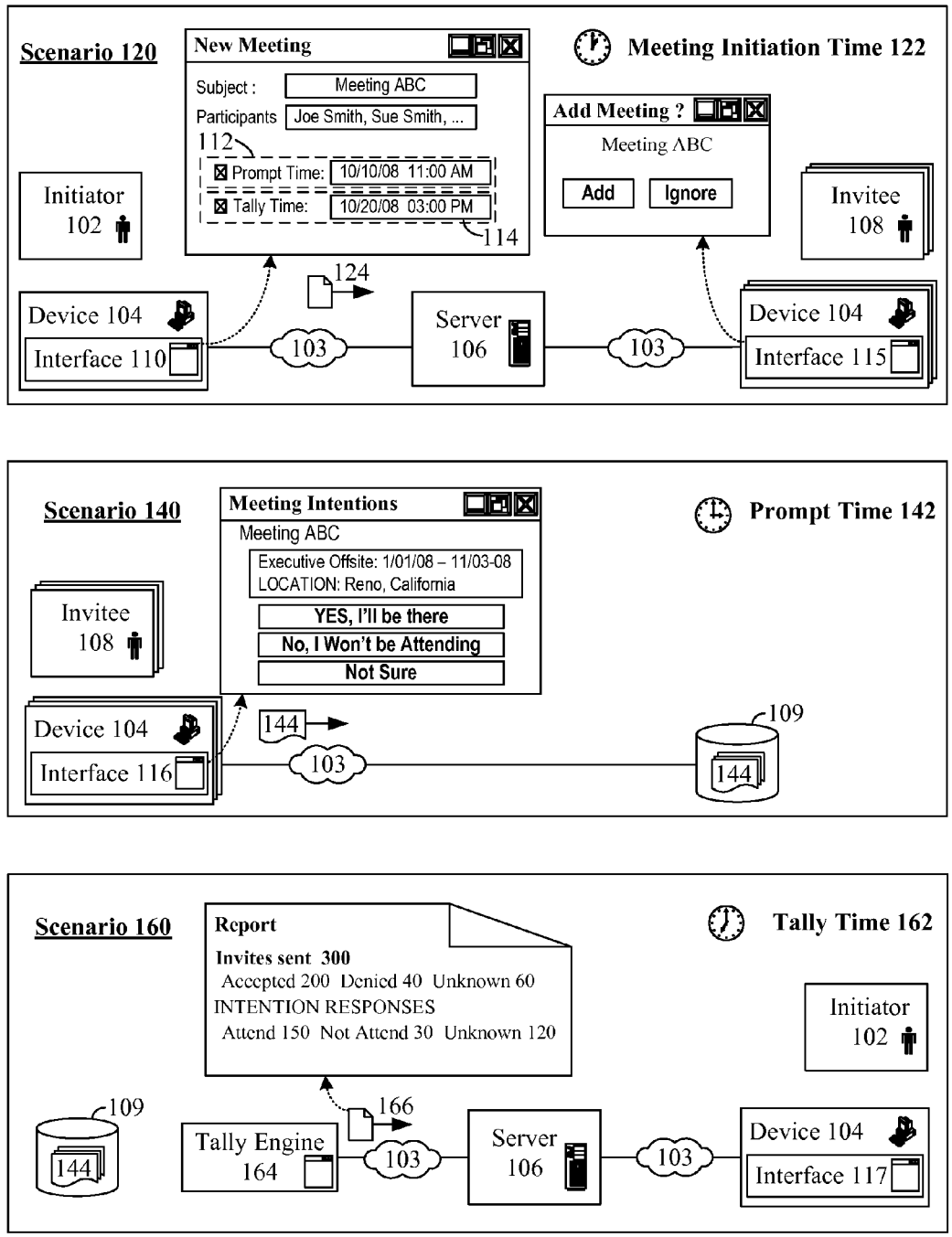
FIG. 1 shows a set of time spaced scenarios that together illustrate a use of a calendaring system that permits a meeting initiator to establish a prompt time and a tally time for meeting attendance intentions in accordance with an embodiment of the inventive arrangements disclosed herein.

The present invention permits a meeting initiator to designate a prompting time, when a meeting entry is established in a calendaring system. The prompting time can be a time when potential invitees are to be sent intention messages, which prompts the potential invitees to indicate whether they are going to attend the meeting. The prompting time can be any time, which will often be a time relatively close to the actual meeting time to be relatively accurate, yet which still provides sufficient advanced warning for a coordinator to make suitable adjustments based upon attendance estimates.

Additionally, the invention permits a tally time to be specified. The tally time can be a time when intention responses are automatically grouped, summarized, and results are conveyed to a designated coordinator (typically the meeting initiator). Any responses conveyed before the tally time can be held in a delay queue, as opposed to being conveyed to the coordinator's standard email inbox. The queuing can occur at the server side (e.g., email server), at the client side (e.g., email client), or at points in-between (e.g., middleware or network element queuing). When the tally time occurs, a programmatic routine can automatically summarize intention results. These results can be presented as an intention summary to the meeting coordinator, which reduces the burden of manual tallying of responses from the coordinator.

The present invention may be embodied as a method, system, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows a set of time spaced scenarios 120, 140, 160 that together illustrate a use of a calendaring system that permits a meeting initiator 102 to establish a prompt time 112 and a tally time 114 for meeting attendance intentions in accordance with an embodiment of the inventive arrangements disclosed herein. Scenario 120 denotes a set of activities occurring at a meeting initiation time; scenario 140 denotes a set of activities occurring at a prompt time 142, and scenario 160 denotes a set of activities occurring at a tally time 162. These times 122, 142, and 162 are to be flexibly interpreted to represent a span of time about a specific occurrence. Computing system delays, message delivery delays, and other delays expected in computing systems as well as application, administrator, and user imposed delays (through user specific settings, etc.) are to be expected and are to be considered within the span of time about the specific occurrence.

In scenario 120 at a meeting initiation time 122, an initiator 102 can use interface 110 of computing device 104 to establish a new meeting. This interface 110 can include a prompt time element 112 for establishing a prompt time 142 and a tally time element 114 for establishing a tally time 162. The prompt time 142 (input in element 112) can be a time when potential invitees are to be sent intention messages, which prompts the potential invitees to indicate whether they are going to attend the meeting. The tally time 162 (input in element 114) can be a time when intention responses are automatically grouped, summarized, and results are conveyed to a designated coordinator. For purposes of FIG. 1, it should be assumed that the meeting initiator 102 is the designated coordinator. In real-world implementations, the initiator 102 can designate a set of one or more individuals at the meeting establishment time 122 to serve as designated coordinators.

Input to interface 110 can be recorded in a meeting initialization request 124, which is conveyed to server 106. The server 106 can include a calendaring server for managing calendar events and/or a communication server (e.g., an email server). Thus, server 106 can actually be implemented as a set or cluster of interrelated servers each having a combined functionality as indicated herein. The server 106 can determine a set of invitees 108 from the meeting initialization request 124 and can send invitation messages to each. Hence, each invitee 108 can receive through an interface 115 of a computing device 104 a meeting event notice. This notice can either be added to the invitee's personal calendar or not, at the invitee's option. It should be noted that the invitee 108 is not prompted regarding their intention to attend the meeting at this time 122.

In scenario 140 at a prompt time 142, an invitee 108 can be prompted through interface 116 of computing device 104 to indicate whether that invitee 108 intends to attend the meeting. Intention responses 144 can be conveyed to server 106, where they are queued in data store 109. The prompting for invitee 108 intentions can occur automatically based upon programmatic triggers established at initiation time 122 based upon values entered by the meeting initiator 102 into the prompt time element 112.

In scenario 160 at a tally time 162, a tally engine 164 can use responses from invitees 108 queued in data store 109 to generate a tally report 166. This tally report 166 can contain a summary of expected meeting attendance. The report 166 can optionally include links to source documents (responses 109), a table showing each invitee's response information, projected attendance at a meeting (which can estimate attendance by non-responding invitees 108), and the like. In one embodiment, the actual responses 109, which were previously delayed in data store 109 can also be conveyed to the initiator 102. The initiator 102 can access this information through an interface 117 of computing device 104. The prompting for invitee 108 intentions can occur automatically based upon programmatic triggers established at initiation time 122 based upon values entered by the meeting initiator 102 into the tally time element 114.

In one embodiment, the various interfaces 110, 115, 116, 117 shown in the scenarios 120, 140, 160 can be part of an integrated calendaring system, such as LOTUS NOTES. In another embodiment, the interfaces 110, 115, 116, 117 can be interfaces from many different software applications, which are communicatively linked to permit them to exchange information. User interfaces 110, 115, 116, 117 can be implemented as graphical user interface (GUIs), Voice User Interfaces (VUIs), multi-modal interfaces, small device interfaces, embedded device interfaces, and the like. The views shown for the interfaces 110, 115, 116, 117 are for illustrative purposes only and other interface controls, arrangement, elements, and the like are to be considered within scope of the invention, which is not to be restricted to those illustrative interface elements shown.

The meeting management software associated interfaces 110, 115, 116, 117 can include one or more computer program products through which meetings are able to be defined and managed. The meeting management software can be an integrated component of a collaboration suite or can be a stand-alone program. For example, the meeting management software can include, but is not limited to LOTUS SAMETIME, I-CALENDAR, SHAREPOINT, OFFICE LIVE, OUTLOOK, MS PROJECT, and the like. The meeting management software can also be communicatively linked to one or more communication servers, which include email servers, instance messaging servers, fax servers, automated dialing servers, and the like.

Also, different computing devices 104 can be used by different individuals 102, 108 to access this calendaring system at different times. Thus, the different invitees 108 can use different client-side applications (having application specific interfaces 115 and 116) to maintain their own electronic calendars. Any of a variety of computing arrangements can be utilized to implement the scenarios 120, 140, 160, all of which are to be considered within a scope of the present document.

The computing device(s) 104 and server 106 can be any computing device capable of rendering and serving content of user interfaces 110, 115, 116, 117 and of performing the processing for meeting events described herein. Clients 104 can include, for example, a personal computer, a notebook computer, a thin client, a kiosk, an embedded computing device, a smart phone, a personal data assistant, a wearable computer, an electronic gaming device, an internet appliance, a media player, a navigation device, and the like. Server(s) 106 can include a set of one or more servers, virtual or physical, capable of facilitating meetings and exchanging communications among initiator 102 and invitee(s) 108. In one embodiment, the server(s) 106 can be implemented in a cluster or another redundant fashion, which enhances a scalability and a resiliency of the solution presented in FIG. 1.

As used herein, the meeting initiation time 122, the prompting time 142, and the tally time 162 each represent a time span for a set of activities to occur. These times 122, 142, 162 are to be construed liberally to include standard processing and interactive times, which can include delays for data store batch processing, synchronization, confirmation, and the like. Thus, each of these times can represent a time span from minutes to hours or days, depending upon implementation specifics.

A meeting is defined within as an occurrence or event involving a set of one or more users 102, 108. A meeting can also have an associated location, time, and purpose. The meeting can include a physical gathering which one or more person is able to attend, a virtual meeting space, and combinations of the two. Meetings can include one-time occasions as well as repeating occurrences based upon a definable interval.

Network 103, which connects the devices 104, server 106, and data store 109 to each other, can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 103 can include local components and data pathways necessary for communications to be exchanged among computing device components and between integrated device components and peripheral devices. The network 103 can also include network equipment, such as routers, data lines, hubs, and intermediary servers which together form a packet-based network, such as the Internet or an intranet. The network 103 can further include circuit-based communication components and mobile communication components, such as telephony switches, modems, cellular communication towers, and the like. The network 103 can include line based and/or wireless communication pathways.

The information managed by server 106 and device(s) 014 can be stored in a one or more data stores, which includes data store 109. These data stores can be a physical or virtual storage spaces configured to store digital information. The data stores can be physically implemented within any type of hardware including, but not limited to, a magnetic disk, an optical disk, a semiconductor memory, a digitally encoded plastic memory, a holographic memory, or any other recording medium. Each of data stores can be a stand-alone storage unit as well as a storage unit formed from one or more physical devices. Additionally, information can be stored within the data stores in a variety of manners. For example, information can be stored within a database structure or can be stored within one or more files of a file storage system, where each file may or may not be indexed for information searching purposes. Further, the data stores can optionally utilize one or more encryption mechanisms to protect stored information from unauthorized access.

The diagrams in FIG. 1 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for delayed meeting intention response comprising:
    a computing device identifying a meeting initialization request for a meeting, wherein said meeting initialization request specifies a prompt time for attendance intentions;
    the computing device establishing a programmatic trigger for the prompt time, referred to as the prompt trigger;
    the computing device firing the prompt trigger when a current time equals the prompt time;
    the computing device determining at least one potential attendee of the meeting; and
    the computing device sending an intention message to the determined potential attendee responsive to a firing of the prompt trigger, wherein said intention message prompts the potential attendee to indicate whether the potential attendee intends to attend the meeting, wherein the intention message comprises a set of user selectable answers for whether the potential attendee will attend the meeting, said user selectable answers comprising: yes, no, and a response indicating that the potential attendee is not sure whether the potential attendee will be attending the meeting.

2. The method of claim 1, wherein the meeting initialization request is received during a meeting initialization time, wherein the prompt time is a user configured time having a date and time established by a meeting initiator who completed the meeting initialization request.

3. The method of claim 1, further comprising:
    the computing device receiving user input entered into a prompt element of a user interface, wherein said user interface is one used to establish a new meeting time, a plurality of meeting participants, a meeting title, and other meeting attributes, wherein the input entered into the prompt element defines the prompt time.

4. The method of claim 1, wherein the sending comprises at sending an email message to email addresses of at least a portion of the at least one determined potential attendees.

5. The method of claim 1, wherein the meeting initialization request is received by meeting management software, where said meeting management software stores meeting specifics from the meeting initialization request in a data store comprising a plurality of meeting records, wherein each of said meeting record comprises a primary key for a meeting event, an attribute for meeting time, and an attribute for prompt time.

6. The method of claim 1, wherein said meeting initialization request comprises a tally time for the meeting, said method further comprising:
the computing device establishing a programmatic trigger for the tally time, referred to as the tally trigger;
the computing device firing the tally trigger when a current time equals the tally time;
the computing device compiling metrics from a plurality of intention responses from potential attendees; wherein the plurality of intention responses indicate whether the potential attendees intend to attend the meeting; and
the computing device creating from these compiled metrics an expected attendance report, which is made available to at least one party designated as authorized by an meeting initiator of the meeting initialization request, wherein the meeting initialization request is received during a meeting initialization time, wherein the prompt time is a user configured time having a date and time established by the meeting initiator who completed the meeting initialization request, wherein the tally time is a user configured time having a date and time established by the meeting initiator.

7. A method for summarizing intention responses comprising:
the computing device identifying a meeting initialization request for a meeting, wherein the meeting initialization request specifies a tally time for the meeting;
the computing device establishing a programmatic trigger for the tally time;
the computing device firing the programmatic trigger when a current time equals the tally time;
the computing device compiling metrics from a plurality of intention responses from potential attendees; wherein the plurality of intention responses indicate whether the potential attendees intend to attend the meeting, wherein each of the intension responses provides an answer to whether the corresponding potential attendee is to attend the meeting, wherein said answer is selected from a set of answers comprising: yes, no, and a response indicating that the corresponding potential attendee is not sure whether the potential attendee will be attending the meeting; and
the computing device creating from these compiled metrics an expected attendance report, which is made available to at least one party designated as authorized by an initiator of the meeting initialization request.

8. The method of claim 7, wherein the tally time is a user configured time having a date and time established by the meeting initiator.

9. The method of claim 7, further comprising:
the computing device receiving user input entered into a tally element of a user interface, wherein said user interface is one used to establish a new meeting time, a plurality of meeting participants, a meeting title, and other meeting attributes, wherein the input entered into the tally element defines the tally time.

10. The method of claim 7, further comprising:
sending the expected attendance report to the at least one party responsive to the firing of the tally trigger.

11. The method of claim 7, wherein the meeting initialization request is received by meeting management software, where said meeting management software stores meeting specifics from the meeting initialization request in a data store comprising a plurality of meeting records, wherein each of said meeting record comprises a primary key for a meeting event, an attribute for meeting time, and an attribute for tally time.

12. The method of claim 7, wherein said meeting initialization request comprises a prompt time for the meeting, said method further comprising:
the computing device receiving user input entered into a tally element of a user interface;
the computing device receiving user input entered into a prompt element of the user interface, wherein the user interface is one used to establish a new meeting time, a plurality of meeting participants, a meeting title, and other meeting attributes, wherein the input entered into the tally element defines the tally time, and wherein the input entered into the prompt element defines the prompt time;
the computing device establishing a programmatic trigger for the prompt time, referred to as the prompt trigger;
the computing device firing the prompt trigger when a current time equals the prompt time;
the computing device determining at least one potential attendee of the meeting; and
the computing device sending an intention message to the determined potential attendee responsive to a firing of the prompt trigger, wherein said intention message prompts the potential attendee to indicate whether the potential attendee intends to attend the meeting.

13. The method of claim 7, wherein said steps of claim 8 are steps performed automatically by at least one machine in accordance with at least one computer program having a plurality of code sections that are executable by the at least one machine, said at least one computer program being stored in a machine readable medium.

14. A system comprising hardware and software for managing meetings that permits and establishment of at least one of a prompt time and a tally time comprising:
a meeting management software program stored in a non-transitory machine usable medium configured to receive, manage, and store meeting specific information and configured to perform a plurality of programmatic actions related to the meeting specific information;
a meeting data store configured to store digitally encoded information comprising the meeting specific information used by the meeting management software program; and
a user interface of the meeting management software program comprising a meeting establishment view, said meeting establishment view comprising a plurality of interface controls for establishing specifics for a meeting, said meeting establishment view comprising a prompt time element configured to accept input defining a configurable prompt time, wherein said prompt time represents a time when potential attendees are to be presented messages to indicate whether each potential attendee intends to attend the meeting, wherein said meeting management software is configured to establish a programmatic trigger for the prompt time, referred to as the prompt trigger, and wherein the meeting management software is configured to fire the prompt trigger and is configured to perform a programmatic action related to the prompt time when a current time equals the prompt time, wherein the messages presented to potential attendees to indicate whether each potential attendee intends to attend the meeting comprise a set of user selectable answers for whether the potential attendee will attend the meeting, said set of user selectable answers comprising: yes, no, and a response indicating that the potential attendee is not sure whether the potential attendee will be attending the meeting.

15. The system of claim 14, wherein said user interface further comprises at least one tally element, wherein the input entered into the tally element defines the tally time, wherein said tally time represent a time at which metrics from a plurality of intention responses from potential attendees for a meeting are to be compiled and made available to a party designated by a meeting initiator, wherein the plurality of intention responses indicate whether the potential attendees intend to attend the meeting, wherein said meeting management software is configured to establish a programmatic trigger for the tally time, referred to as the tally trigger, and wherein the meeting management software is configured to fire the tally trigger and is configured to perform a programmatic action related to the tally time when a current time equals the tally time.

16. The system of claim 15, wherein said meeting data store is configured to store a plurality of indexed database records stored in database tables, wherein one of said database tables is a meeting table that has a primary key of a meeting identifier, wherein said meeting table has an attribute defining the prompt time, and wherein said meeting table has an attribute defining the tally time.

17. The system of claim 16, wherein the database tables are relational database management system (RDBMS) tables configured in third normal form.

18. The system of claim 14, further comprising:
communication software stored in a machine usable medium configured to permit a user to communicate with a plurality of other users, wherein said meeting management software program and said communication software are configured to interact to automatically send messages to each potential participant of a meeting, as defined in the meeting data store, when the prompt trigger fires.

* * * * *